US012753531B2

(12) United States Patent
Takaoka

(10) Patent No.: US 12,753,531 B2
(45) Date of Patent: Oct. 6, 2026

(54) DEVICE FOR MANUFACTURING FILAMENT THREE-DIMENSIONAL BONDED MEMBER

(71) Applicant: airweave inc., Aichi (JP)

(72) Inventor: Motokuni Takaoka, Aichi (JP)

(73) Assignee: airweave inc., Aichi (JP)

( * ) Notice: Subject to any disclaimer, the term of this patent is extended or adjusted under 35 U.S.C. 154(b) by 53 days.

(21) Appl. No.: 19/105,818

(22) PCT Filed: Sep. 28, 2023

(86) PCT No.: PCT/JP2023/035385
§ 371 (c)(1),
(2) Date: Feb. 24, 2025

(87) PCT Pub. No.: WO2024/071296
PCT Pub. Date: Apr. 4, 2024

(65) Prior Publication Data

US 2026/0070276 A1 Mar. 12, 2026

(30) Foreign Application Priority Data

Sep. 30, 2022 (JP) ................................ 2022-157674

(51) Int. Cl.
*D01D 11/04* (2006.01)
*B29C 48/05* (2019.01)
(Continued)

(52) U.S. Cl.
CPC .............. *D01D 11/04* (2013.01); *B29C 48/05* (2019.02); *B29C 48/82* (2019.02); (Continued)

(58) Field of Classification Search
CPC ...... D04H 3/16; D01D 10/0436; D01D 11/04; B29C 48/355; B29C 48/919
See application file for complete search history.

(56) References Cited

U.S. PATENT DOCUMENTS 3,837,781 A * 9/1974 Lambertus .......... B29C 48/9145 425/308
3,921,882 A * 11/1975 Shulze .................. D01D 11/04 242/615.3

(Continued)

FOREIGN PATENT DOCUMENTS

JP 2004188613 7/2004
JP 2004218116 8/2004

(Continued)

OTHER PUBLICATIONS

"International Search Report (Form PCT/ISA/210) of PCT/JP2023/035385", mailed on Dec. 19, 2023, with English translation thereof, pp. 1-4.

*Primary Examiner* — Benjamin A Schiffman
(74) *Attorney, Agent, or Firm* — JCIPRNET

(57) ABSTRACT

In a device for manufacturing a filament three-dimensional bonded member that includes: a molten filament supply unit that discharges a molten filament group downward; a chute that includes a chute inclined plate which receives a molten filament at an end in thickness direction of the group and displaces the group in such a direction as to reduce thickness of the group; a cooling water supply unit that supplies cooling water to the plate; and a fusing formation unit that three-dimensionally entangles molten filaments and simultaneously fuses contact points, grooves are formed in an upper surface of the plate, the width of each of the grooves is 0.1 mm or more and 3.0 mm or less, the depth of each of the grooves is 0.1 mm or more and 3 mm or less and a distance between the adjacent grooves is 1 mm or more and 7 mm or less.

12 Claims, 6 Drawing Sheets

(51) Int. Cl.

| | |
|---|---|
| ***B29C 48/82*** | (2019.01) |
| ***D01D 10/04*** | (2006.01) |
| ***D04H 3/16*** | (2006.01) |
| *B29C 48/355* | (2019.01) |
| *B29C 48/88* | (2019.01) |

(52) U.S. Cl.
CPC ........... *D01D 10/0436* (2013.01); *D04H 3/16* (2013.01); *B29C 48/355* (2019.02); *B29C 48/919* (2019.02)

(56) References Cited

U.S. PATENT DOCUMENTS

| | | | | | |
|---|---|---|---|---|---|
| 5,310,515 | A * | 5/1994 | Jurgen | B29B 7/58 264/237 |
| 8,568,635 | B2 * | 10/2013 | Takaoka | B29C 43/22 428/218 |
| 9,174,404 | B2 * | 11/2015 | Takaoka | B29C 48/05 |
| 9,194,066 | B2 * | 11/2015 | Takaoka | B29C 48/18 |
| 2011/0175253 | A1 * | 7/2011 | Bilk | D01D 11/04 264/177.1 |

FOREIGN PATENT DOCUMENTS

| | | | |
|---|---|---|---|
| JP | 2008221756 | A * | 9/2008 |
| JP | 4181878 | | 11/2008 |
| JP | 4966438 | | 7/2012 |
| JP | 2020045589 | | 3/2020 |
| JP | 2022175809 | | 11/2022 |
| JP | 2025064089 | A * | 4/2025 |
| WO | 2012035736 | | 3/2012 |

* cited by examiner

DEVICE FOR MANUFACTURING FILAMENT THREE-DIMENSIONAL BONDED MEMBER

CROSS-REFERENCE TO RELATED APPLICATION

This application is a 371 application of the International PCT application serial no. PCT/JP2023/035385, filed on Sep. 28, 2023, which claims the priority benefits of Japan Patent Application No. 2022-157674, filed on Sep. 30, 2022. The entirety of each of the above-mentioned patent applications is hereby incorporated by reference herein and made a part of this specification.

TECHNICAL FIELD

The present invention relates to a device for manufacturing a filament three-dimensional bonded member which can be used as a cushion material for a mattress, a pillow and the like.

BACKGROUND ART

As a cushion material which overcomes disadvantages of metal springs and urethane foam that are time-consuming for recycling, attention has been focused on a filament three-dimensional bonded member (three-dimensional reticular structure) obtained by three-dimensionally fusing filaments made of a thermoplastic elastomer. This cushion material is easy to recycle, and has the advantage of being steam resistant and washable.

As a method for manufacturing the filament three-dimensional bonded member, for example, Patent Document 1 discloses a method for manufacturing the filament three-dimensional bonded member (three-dimensional reticular structure) by dropping a molten filament group (linear aggregate of a thermoplastic resin in a molten state) formed with a plurality of molten filaments flowing downward in a vertical direction into cooling water, forming molten filament loops by the buoyancy of water, simultaneously bringing the molten filaments into contact with each other by deformation caused when the loops are formed and fusing contact points thereof.

Patent Document 1 also discloses that in order to make the thickness of the filament three-dimensional bonded member constant, a pair of chutes are provided which are inclined from both ends of the molten filament group toward a center portion in the thickness direction of the molten filament group, and in order to spread the cooling water over the entire surfaces of the chutes, the surfaces of the chutes are covered with water-permeable sheets such as bleached cloth and the cooling water is supplied to the water-permeable sheets to form cooling water layers over the entire surfaces of the chutes. By spreading the cooling water, it is possible to prevent the molten filaments from being adhered to the surfaces of the chutes.

However, in the method of covering the surfaces of the chutes with the water-permeable sheets, there are disadvantages such as the occurrence of wrinkles in the water-permeable sheets, foreign matter (such as rust) adhered thereto and wear and tear of the water-permeable sheets caused by long-term manufacturing. As a method for overcoming the disadvantages, Patent Document 2 discloses that cooling water layers are formed on the surfaces of chutes by roughening the surfaces of the chutes through sandblasting without use of water-permeable sheets.

FIG. 11 is a conceptual view showing a state where the surface 531*s* of a chute 531 is roughened by sandblasting treatment. As shown in the figure, projections and recesses are formed in the surface 531*s*. FIG. 12 shows a state where cooling water supplied to the surface 531*s* of the chute 531 is retained or decelerated by the projections and recesses, and thus a cooling water film W is formed.

RELATED ART DOCUMENT

Patent Document

Patent Document 1: Japanese Patent No. 4181878
Patent Document 2: Japanese Patent No. 4966438

DISCLOSURE OF THE INVENTION

Problems to be Solved by the Invention

However, it is difficult to make the depth and the width of the recesses constant over all the area of the surface of the chute by sandblasting treatment, the inclination angle of the recesses is small and thus the ability to retain or decelerate the cooling water is low, with the result that it is difficult to form a uniform thin cooling water film when a small amount of cooling water is provided. Since in the area of shallow recesses (area which is relatively projecting), the ability to retain or decelerate the cooling water is lowered even locally, even if the cooling water is supplied to the surface of the chute, it is likely that a cooling water film to be caused by the surface tension of water flows down while being not formed. Consequently, molten filaments are temporarily adhered to the surface of the chute where the cooling water film is not formed, and the speed at which the molten filaments move on the surface of the chute becomes irregular, with the result that the filament three-dimensional bonded member is disadvantageously nonuniform.

When the amount of cooling water supplied is increased in order to reliably form the cooling water film on the surface of the chute, the molten filaments are cooled, and thus adhesive strength at the fusing points of the molten filaments is disadvantageously lowered. When the overall surface of the chute is roughened so that the cooling water is retained or decelerated in the area of shallow recesses, the molten filaments are less likely to slip on the surface of the chute, and thus the molten filaments are temporarily more likely to be adhered, with the result that a trade-off is disadvantageously made.

In view of the disadvantages described above, an object of the present invention is to provide a device for manufacturing a filament three-dimensional bonded member which can form a more uniform filament three-dimensional bonded member without lowering adhesive strength at the fusing points of molten filaments.

Means for Solving the Problem

In a device for manufacturing a filament three-dimensional bonded member according to the present invention that includes: a molten filament supply unit that discharges a molten filament group formed with a plurality of molten filaments downward in a vertical direction; a chute that includes a chute inclined plate which receives the molten filament at an end in the thickness direction of the molten filament group and displaces the molten filament group in such a direction as to reduce the thickness of the molten filament group; a cooling water supply unit that supplies cooling water to the chute inclined plate; and a fusing formation unit that three-dimensionally entangles the molten filaments and simultaneously fuses contact points, a plurality of grooves are formed in an upper surface of the chute inclined plate, the width of each of the plurality of grooves is equal to or greater than 0.1 mm and equal to or less than 3.0 mm, the depth of each of the plurality of grooves is equal to or greater than 0.1 mm and equal to or less than 3 mm and a distance between the grooves adjacent to each other is equal to or greater than 1 mm and equal to or less than 7 mm. In this configuration, it is possible to form a more uniform filament three-dimensional bonded member without lowering adhesive strength at the fusing points of the molten filaments.

In the configuration described above, more specifically, the plurality of grooves may be formed at equal intervals to extend in parallel. In the configuration described above, more specifically, the plurality of grooves may be formed to extend obliquely at an angle equal to or greater than 30 degrees and equal to or less than 60 degrees relative to the maximum inclination direction of the chute inclined plate. In the configuration described above, more specifically, the cross-sectional shape of each of the plurality of grooves may be quadrangular.

In the configuration described above, more specifically, a hydrophilic polymer may be applied to or embedded in all or a part of the plurality of grooves. In the configuration described above, more specifically, the plurality of grooves may be formed to cover an entire region on the upper surface of the chute inclined plate, the entire region receiving the molten filament, and the cooling water supply unit may be arranged to supply the cooling water to all of the grooves that cover the entire region.

Advantages of the Invention

In a device for manufacturing a filament three-dimensional bonded member according to the present invention, it is possible to form a more uniform filament three-dimensional bonded member without lowering adhesive strength at the fusing points of molten filaments.

DESCRIPTION OF EMBODIMENTS

Embodiments of the present invention will be described below with reference to drawings. In the following description, an up/down direction, a left/right direction and a forward/backward direction (which are orthogonal to each other) are as shown in the figures. These directions are only determined for convenience such that a vertical direction is the up/down direction, and a direction in which a pair of chutes 31 and 32 to be described later (the surfaces of chute vertical plates 31*b* and 32*b*) are opposite each other is the forward/backward direction.

1. First Embodiment

Figure 1:
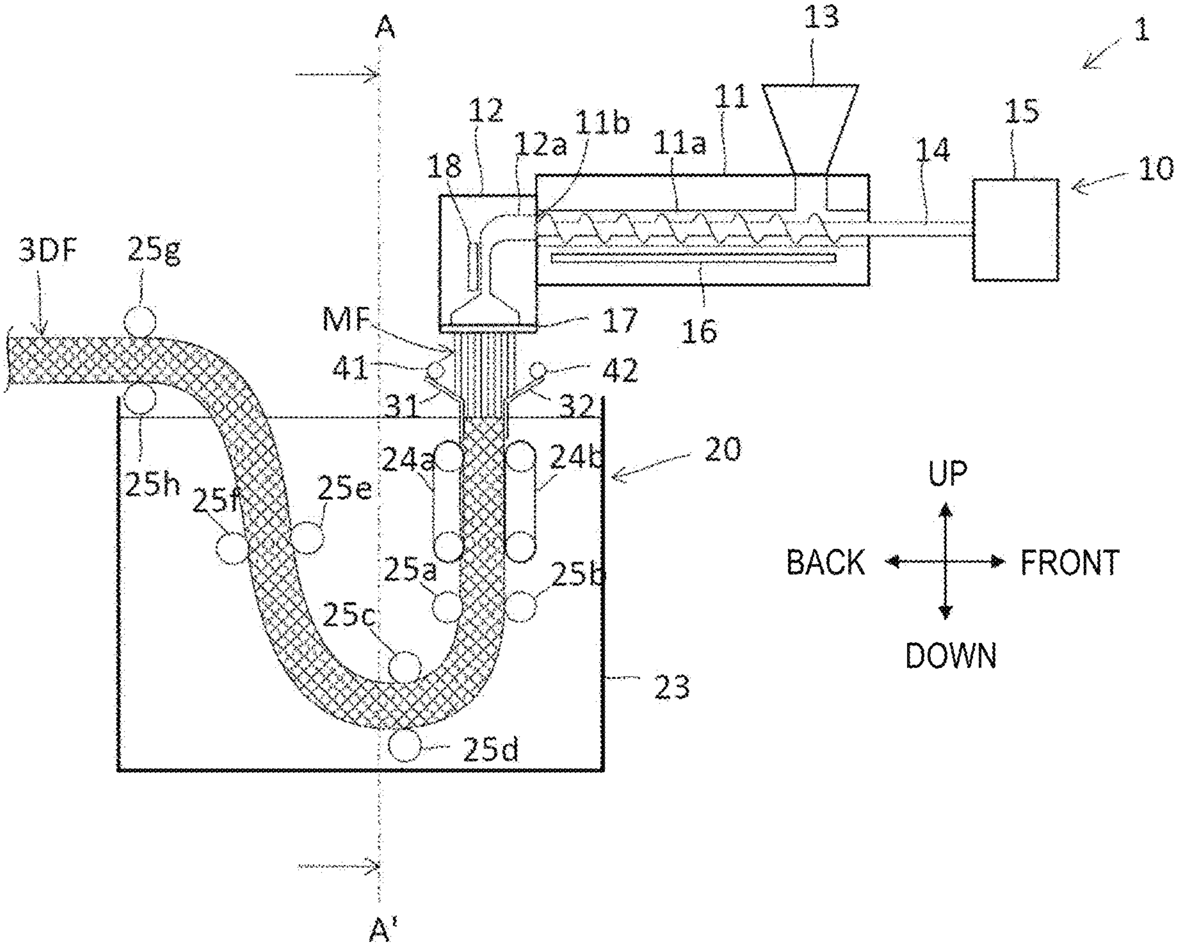
FIG. 1 is a conceptual view of a device for manufacturing a filament three-dimensional bonded member according to a first embodiment.
Figure 2:
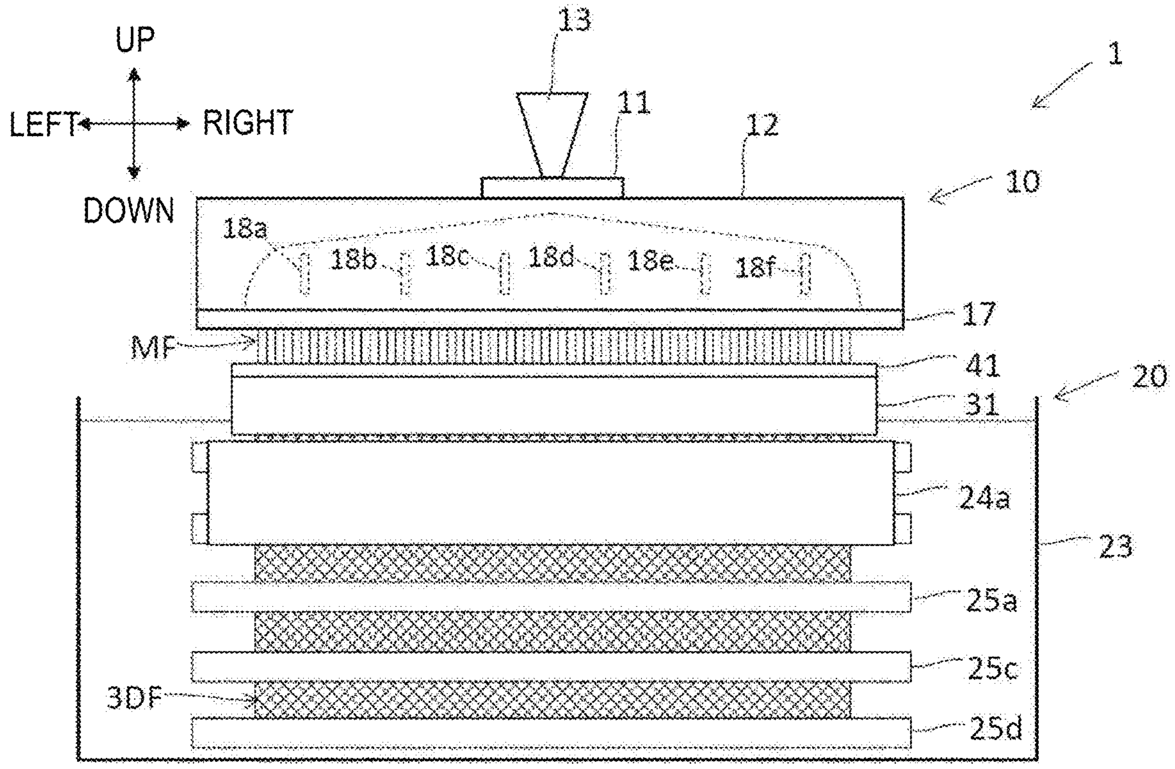
FIG. 2 is a cross-sectional view of the manufacturing device shown in FIG. 1 which is indicated by arrows and taken along line A-A'.

A first embodiment of the present invention will first be described. FIG. 1 is a conceptual view of a device for manufacturing a filament three-dimensional bonded member 1 according to the first embodiment of the present invention. FIG. 2 is a cross-sectional view of the manufacturing device 1 shown in FIG. 1 which is indicated by arrows and taken along line A-A'.

The device for manufacturing a filament three-dimensional bonded member 1 includes: a molten filament supply unit 10 which discharges a molten filament group MF formed with a plurality of molten filaments having a diameter of 0.5 mm to 3 mm downward in the vertical direction; a fusing formation unit 20 which three-dimensionally entangles the molten filament group MF, simultaneously fuses contact points and thereafter cools and solidifies the molten filament group MF to form a filament three-dimensional bonded member; a pair of chutes 31 and 32 which receive the molten filaments at ends in the thickness direction of the molten filament group MF (both left and right ends in the forward/backward direction) and displace the molten filament group MF in such a direction as to reduce the thickness of the molten filament group MF; and cooling water supply units 41 and 42 which supply cooling water to upper portions of the chutes 31 and 32.

The molten filament supply unit 10 includes a pressurization melting unit 11 (extruder) and a filament discharge unit 12 (die). The pressurization melting unit 11 includes a material input unit 13 (hopper), a screw 14, a screw motor 15 which drives the screw 14, a screw heater 16 and a plurality of temperature sensors which are not shown in the figure, and a cylinder 11*a* for conveying a thermoplastic resin supplied from the material input unit 13 while heating and melting the thermoplastic resin with the screw heater 16 is formed inside the pressurization melting unit 11.

In the cylinder 11*a*, the screw 14 is rotatably stored. In a side end of cylinder 11*a* on a downstream side, a cylinder discharge port 11*b* for discharging the thermoplastic resin toward the filament discharge unit 12 is formed. The heating temperature of the screw heater 16 is controlled, for example, based on the detection signal of a temperature sensor provided in the molten filament supply unit 10.

The filament discharge unit 12 includes a nozzle portion 17, die heaters 18 and a plurality of temperature sensors which are not shown in the figure, and a guide flow path 12*a* which guides the molten thermoplastic resin discharged from the cylinder discharge port 11*b* to the nozzle portion 17 is formed inside the filament discharge unit 12.

The nozzle portion 17 is a thick plate in which a plurality of openings are formed and which is formed substantially in the shape of a rectangular parallelepiped and is made of metal, and is provided in a lower portion of the filament discharge unit 12 which is the most downstream portion of the guide flow path 12*a*. The openings formed in the nozzle portion 17 will be described later with reference to FIG. 3.

A plurality of (in an example shown in FIG. 2, six die heaters 18*a* to 18*f*) die heaters 18 are provided in the left/right direction to heat the filament discharge unit 12. The heating temperature of the die heaters 18 is controlled, for example, based on the detection signal of a temperature sensor provided in the filament discharge unit 12.

Examples of the thermoplastic resin which can be used as the material of the filament three-dimensional bonded member include: polyolefin resins such as polyethylene and polypropylene; polyester resins such as polyethylene terephthalate; polyamide resins such as nylon 66; a polyvinyl chloride resin; a polystyrene resin; thermoplastic elastomers such as styrene elastomers, vinyl chloride elastomers, olefin elastomers, urethane elastomers, polyester elastomers, nitrile elastomers, polyamide elastomers and fluorine elastomers; and the like.

The thermoplastic resin supplied from the material input unit 13 is heated and melted inside the cylinder 11*a* and is, for example, supplied as the molten thermoplastic resin from the cylinder discharge port 11*b* to the guide flow path 12*a* of the filament discharge unit 12 so as to be extruded by the screw 14. Thereafter, the molten filament group MF formed with a plurality of molten filaments is discharged downward in parallel from the nozzles of the nozzle portion 17.

The fusing formation unit 20 includes a cooling water tank 23, a pair of conveyors 24*a* and 24*b* and a plurality of conveyance rollers 25*a* to 25*h*. The cooling water tank 23 is a water tank for storing the cooling water. Inside the cooling water tank 23, the pair of conveyors 24*a* and 24*b* and the conveyance rollers 25*a* to 25*h* are provided. The pair of conveyors 24*a* and 24*b* and the conveyance rollers 25*a* to 25*h* are driven by an unillustrated drive motor.

Figure 3:
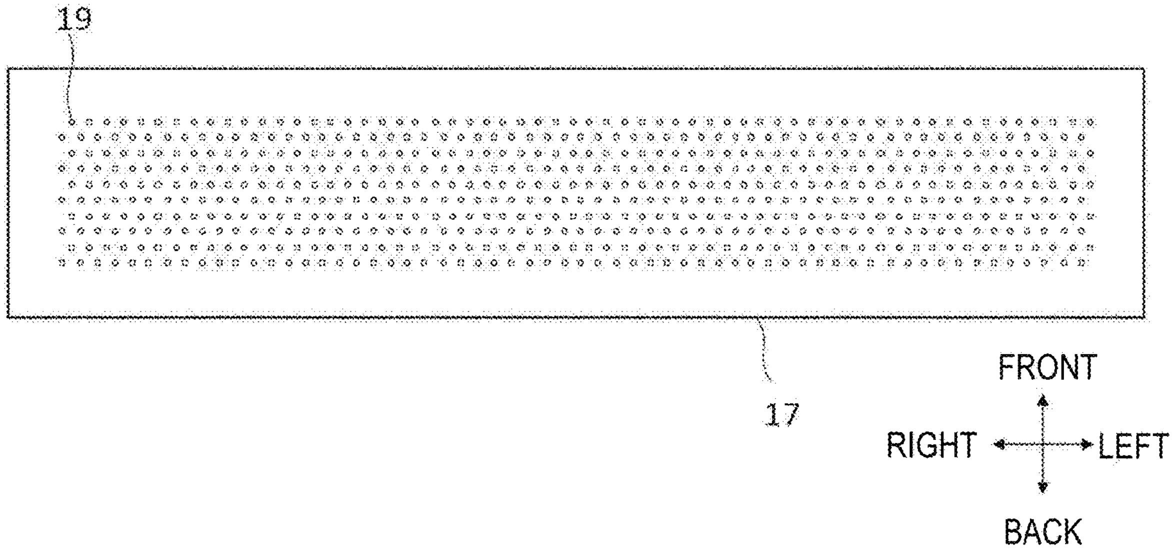
FIG. 3 is a bottom view of a nozzle portion in the first embodiment.

FIG. 3 is a bottom view of the nozzle portion 17. In the nozzle portion 17, a plurality of openings (nozzle group 19) which discharge the molten filament group are formed. In the example of the present embodiment, the cross-sectional shape of the opening is the shape of a circle having an inside diameter of 1 mm, and a distance (pitch) between adjacent nozzles is 10 mm. However, based on the specifications and the like of the filament three-dimensional bonded member to be manufactured, the shape of each nozzle, the inside diameter of each nozzle, a distance between adjacent nozzles, the arrangement pattern of the nozzles in the nozzle group 19 and the like can be adjusted as necessary.

Figure 4:
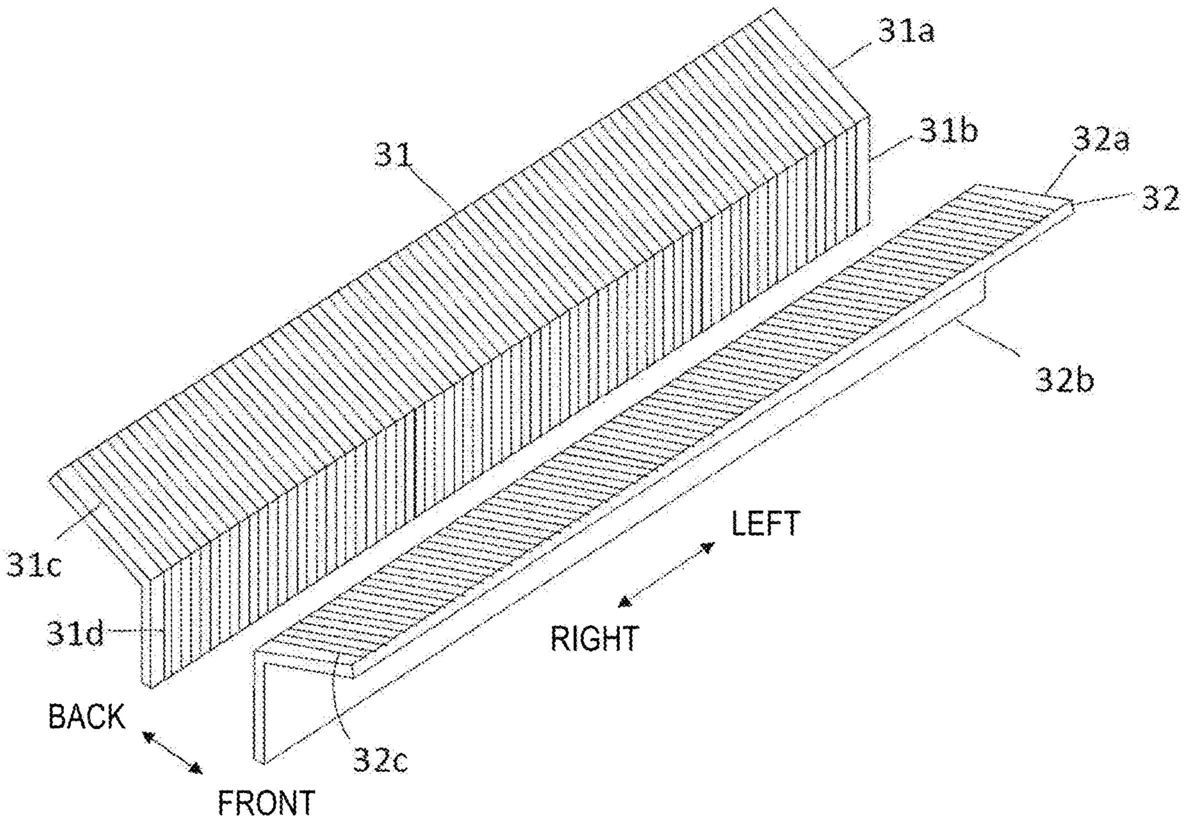
FIG. 4 is a perspective view of chutes in the first embodiment.
Figure 5:
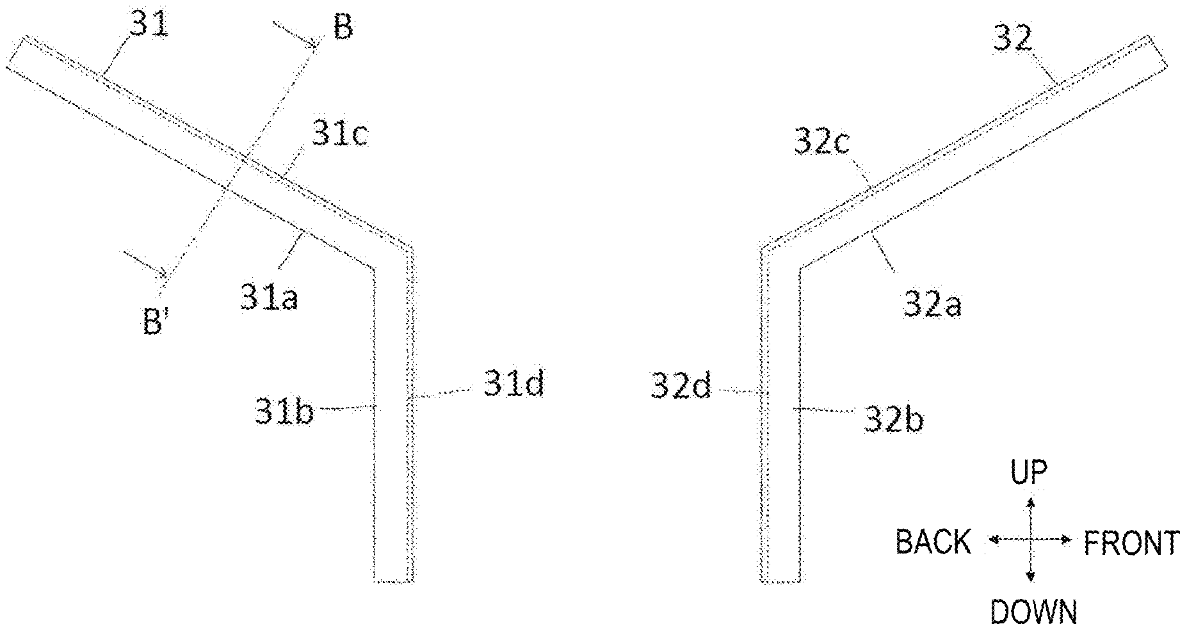
FIG. 5 is an enlarged view of an area around the chutes in FIG. 1.
Figure 6:
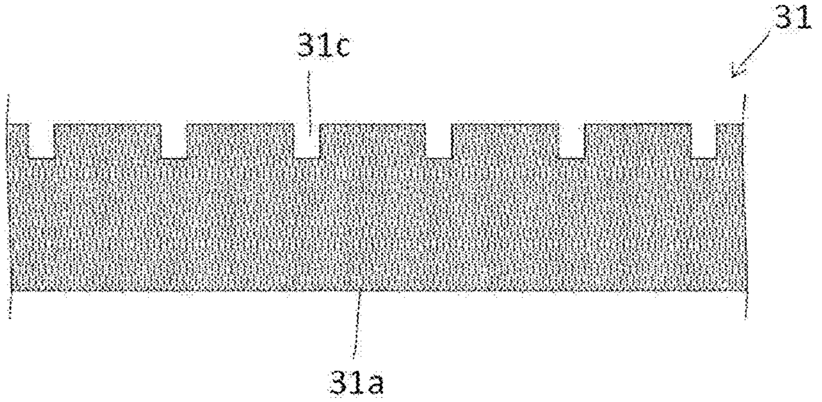
FIG. 6 is an enlarged cross-sectional view of the chute shown in FIG. 5 which is indicated by arrows and taken along line B-B'.

FIG. 4 is a schematic perspective view of the pair of chutes 31 and 32 shown in FIG. 1. FIG. 5 is an enlarged view of an area around the chutes in FIG. 1. FIG. 6 is an enlarged cross-sectional view of the chute 31 shown in FIG. 5 which is indicated by arrows and taken along line B-B'. In the present embodiment, the chute 31 on the back side and the chute 32 on the front side are symmetrical with respect to a virtual plane orthogonal to the forward/backward direction, and play equivalent roles. In the following description of the chutes 31 and 32, one of the chutes 31 and 32 may be described, and the description of the other may be omitted.

The pair of chutes 31 and 32 include; plate-shaped chute inclined plates 31*a* and 32*a* which are inclined downward (inclined downward as they extend inward in the forward/backward direction); and plate-shaped chute vertical plates 31*b* and 32*b* which extend downward in the vertical direction from lower ends of the chute inclined plates 31*a* and 32*a*, and the pair of chutes 31 and 32 are spaced a predetermined distance in the forward/backward direction.

In the upper surfaces of the chute inclined plates 31*a* and 32*a*, a plurality of grooves 31*c* and a plurality of grooves 32*c* are respectively formed at equal intervals to extend in the maximum inclination direction of the chute inclined plates 31*a* and 32*a*. As described above, in the present embodiment, the grooves 31*c* and the grooves 32*c* are formed at equal intervals to extend in parallel. The maximum inclination direction of the chute inclined plates 31*a* and 32*a* is the direction in which the inclination of the upper surfaces of the chute inclined plates 31*a* and 32*a* from a horizontal plane is the maximum, and in the present embodiment, the maximum inclination direction coincides with the direction in which a part (line segment) extends where an imaginary plane orthogonal to the left/right direction intersects with the upper surfaces of the chute inclined plates 31*a* and 32*a*.

In the present embodiment, in the surfaces of the chute vertical plates 31*b* and 32*b* opposite each other, a plurality of grooves 31*d* and a plurality of grooves 32*d* are respectively formed at equal intervals to extend in the vertical direction. The grooves 31*d* extend in parallel, the upper end thereof is connected to the grooves 31*c* and the lower end thereof reaches the lower edge of the chute vertical plate 31*b*. The grooves 32*d* extend in parallel, the upper end thereof is connected to the grooves 32*c* and the lower end thereof reaches the lower edge of the chute vertical plate 32*b*.

Regarding the sizes and the shapes of the grooves 31*c*, 32*c*, 31*d* and 32*d*, in the present embodiment, the width (the size in the left/right direction) of all the grooves is equal to or greater than 0.1 mm and equal to or less than 3.0 mm, the depth of all the grooves is equal to or greater than 0.1 mm and equal to or less than 3 mm and the distance between the grooves adjacent to each other is equal to or greater than 1 mm and equal to or less than 7 mm. The width of the grooves 31*c*, 32*c*, 31*d* and 32*d* is further preferably in the range of 0.5 to 1.5 times the diameter of the molten filament discharged from the nozzle portion 17. When the width of the grooves 31*c*, 32*c*, 31*d* and 32*d* is less than the range, the amount of water which enters the grooves is decreased relative to the amount of molten filament supplied from the nozzle portion 17, and thus the water is easily evaporated. On the other hand, when the width of the grooves 31*c*, 32*c*, 31*d* and 32*d* is greater than the range, the molten filaments fall into the grooves and thus it is difficult to form the cooling water film which will be described later. The cross-sectional shape of all the grooves 31*c*, 32*c*, 31*d* and 32*d* (cross sections taken along a plane orthogonal to the direction of extension of the grooves) is quadrangular (in the example of the present embodiment, rectangular or square) as shown in FIG. 6. In the quadrangle described above, the upper side is the opening surface of the groove. In the example of the present embodiment, the cross-sectional shapes and dimensions of all the grooves 31*c*, 32*c*, 31*d* and 32*d* are the same.

Although in the present embodiment, the chute inclined plates 31*a* and 32*a* and the chute vertical plates 31*b* and 32*b* are plate-shaped, they may be curved. Although in the present embodiment, the pair of chutes 31 and 32 are spaced the predetermined distance, the chutes 31 and 32 may be integrated such that when the chutes 31 and 32 are viewed from above, they form a quadrangular or oval space.

The cooling water supply unit 41 is arranged to supply the cooling water uniformly to an area in the vicinity of the upper end of the entire region on the upper surface of the chute inclined plate 31*a* in the left/right direction. The cooling water supply unit 42 is arranged to supply the cooling water uniformly to an area in the vicinity of the upper end of the entire region on the upper surface of the chute inclined plate 32*a* in the left/right direction. The cooling water supply units 41 and 42 continuously supply the cooling water to the upper surface of the chute inclined plate 31*a* to stably form the cooling water film which will be described later. As the cooling water supplied by the cooling water supply units 41 and 42 to the chute inclined plate 31*a*, for example, water which is supplied from outside the manufacturing device 1 may be used or a part of the cooling water in the cooling water tank 23 may be used.

Figure 7:
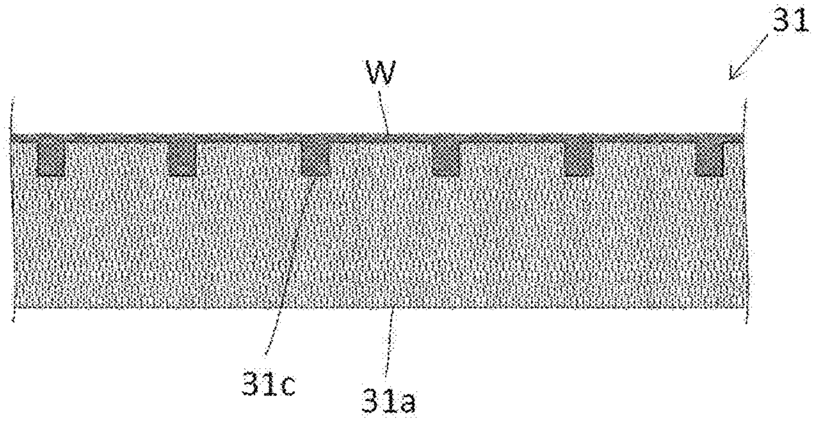
FIG. 7 is a conceptual view showing water trapped in the grooves of the chute shown in FIG. 6 and a cooling water film formed in the surface of the chute.

FIG. 7 is a conceptual view showing water trapped in the grooves 31 shown in FIG. 6 and the cooling water film W formed in the surface (upper surface) of the chute inclined plate 31*a*. When the cooling water is supplied by the cooling water supply units 41 and 42 to the upper surfaces of the chute inclined plates 31*a* and 32*a*, a part of the cooling water enters the narrow grooves 31*c* and 32*c* formed in the upper surfaces of the chute inclined plates 31*a* and 32*a*.

The flow speed of the cooling water entering the grooves 31*c* and 32*c* is significantly slowed down, and thus the cooling water becomes the trapped water. The cooling water is further supplied by the cooling water supply units 41 and 42, the cooling water which flows down the upper surfaces of the chute inclined plates 31*a* and 32*a* is held back by the surface tension of the trapped water in the grooves 31*c* and 32*c* to form a film between two adjacent grooves and the films are joined together to form uniform thin cooling water films over the entire upper surfaces of the chute inclined plates 31*a* and 32*a*.

Since it is likely that air bubbles in the grooves 31*c* and 32*c* are not released immediately after the start of the operation of the manufacturing device 1, water vapor may be supplied toward the chute inclined plates 31*a* and 32*a* to expel the air bubbles from the grooves 31*c* and 32*c* before the operation of the manufacturing device 1. A hydrophilic polymer such as polyvinyl alcohol may be applied to or embedded in all or a part of the grooves 31*c* and 32*c*.

The molten filament group MF discharged from the nozzle portion 17 is adjusted in thickness (dimension in the forward/backward direction) by the chutes 31 and 32, and is deformed by the buoyancy of the cooling water in the cooling water tank 23 and thus the filaments therein form random loops. The random loops adjacent to each other are three-dimensionally entangled in a molten state, the contact points are fused and thus three-dimensional bonded member of the filaments are formed.

Thereafter, the bonded member is conveyed by the pair of conveyors 24*a* and 24*b* and the conveyance rollers 25*a* to 25*h* while being cooled by the cooling water in the cooling water tank 23, and thus the bonded member is discharged to the outside of the cooling water tank 23 as a filament three-dimensional bonded member 3DF. In this way, it is possible to manufacture the filament three-dimensional bonded member 3DF.

As described above, the manufacturing device 1 includes: the molten filament supply unit 10 which discharges the molten filament group MF formed with a plurality of molten filaments downward in the vertical direction; the chutes 31 and 32 which include the chute inclined plates 31*a* and 32*a* that receive the molten filaments at the ends in the thickness direction (forward/backward direction) of the molten filament group MF and displace the molten filament group MF in such a direction as to reduce the thickness of the molten filament group MF; the cooling water supply units 41 and 42 which supply the cooling water to the chute inclined plates 31*a* and 32*a*; and the fusing formation unit 20 which three-dimensionally entangle the molten filaments and simultaneously fuses the contact points.

Furthermore, in the upper surfaces of the chute inclined plates 31*a* and 32*a* of the manufacturing device 1, the grooves 31*c* and 32*c* are formed. In the upper surfaces of the chute inclined plates 31*a* and 32*a*, a plurality of narrow grooves are formed at predetermined intervals, and thus the upper surfaces of the chute inclined plates 31*a* and 32*a* have a uniform and fine structure of projections and recesses, with the result that it is possible to form thin films of the cooling water over the entire upper surfaces of the chute inclined plates 31*a* and 32*a* by the surface tension of water.

A part of the cooling water supplied to the chute inclined plates 31*a* and 32*a* is reliably trapped in the grooves 31*c* and 32*c* (retained or decelerated), and is simultaneously supplied to the upper portions of the chute inclined plates 31*a* and 32*a*, the cooling water which flows down the upper surfaces of the chute inclined plates 31*a* and 32*b* is held back by the surface tension of the trapped water in the grooves to form a film between two adjacent grooves. Hence, it is possible to reliably form thin films of the cooling water over the entire upper surfaces of the chute inclined plates 31*a* and 32*a*. In this way, it is possible to reliably prevent the molten filaments from being adhered to the surfaces of the chute inclined plates 31*a* and 32*a*, and thus it is possible to form a more uniform filament three-dimensional bonded member.

In order to reliably and stably form the thin films of the cooling water on the upper surfaces of the chute inclined plates 31*a* and 32*a*, it is important to appropriately set the widths, the depths and the intervals of the grooves 31*c* and 32*c*. As a result of an investigation and a study performed by the applicant on this point, it has been found that it is appropriate to set the width of each of the grooves 31*c* and 32*c* equal to or greater than 0.1 mm and equal to or less than 3.0 mm, to set the depth of each of the grooves 31*c* and 32*c* equal to or greater than 0.1 mm and equal to or less than 3 mm and to set the distance between the grooves 31*c* and 32*c* adjacent to each other equal to or greater than 1 mm and equal to or less than 7 mm, with the result that the settings described above are also made in the manufacturing device 1 of the present embodiment. The width of each of the grooves 31*c* and 32*c* may be set equal to or greater than 0.1 mm and equal to or less than 1.0 mm or set equal to or greater than 0.1 mm and equal to or less than 0.5 mm.

When the surface of the chute is covered with a water-permeable sheet or the like, it may be separated. However, in the present embodiment, the narrow grooves are directly formed in the surfaces of the chutes (in the upper surfaces of the chute inclined plates 31*a* and 32*a*), and thus the separation as described above does not occur, with the result that it is possible to ensure stable performance even during long-term continuous manufacturing of the filament three-dimensional bonded member. Furthermore, in the present embodiment, it is not necessary to supply a large amount of cooling water to the chute inclined plates 31*a* and 32*a* in order to form the thin films of the cooling water over the entire upper surfaces of the chute inclined plates 31*a* and 32*a*. Hence, it is possible to form the uniform filament three-dimensional bonded member without lowering adhesive strength at the fusing points of the molten filaments.

In the present embodiment, the grooves 31*c* and 32*c* are formed at equal intervals to extend in parallel. Hence, it is possible to form the uniform cooling water films on the chute inclined plates 31*a* and 32*a*.

In the present embodiment, the grooves 31*c* and 32*c* are formed to cover the entire regions on the upper surfaces of the chute inclined plates 31*a* and 32*a* which receive the molten filament, and the cooling water supply units 41 and 42 are arranged to supply the cooling water to all of the grooves 31*c* and 32*c* which cover the entire regions. In this way, it is possible to completely prevent the molten filaments from being adhered to the chute inclined plates 31*a* and 32*a*.

In the present embodiment, the cross-sectional shape of each of the grooves 31*c* and 32*c* is quadrangular, and thus even if the surfaces of the chute inclined plates 31*a* and 32*a* are worn down due to long-term use, the widths of the grooves 31*c* and 32*c* can be kept constant. As described previously, a hydrophilic polymer such as polyvinyl alcohol may be applied to or embedded in all or a part of the grooves 31*c* and 32*c*. In this way, the hydrophilic polymer in the grooves 31*c* and 32*c* enhances the ability to retain the trapped water, and thus it is possible to minimize evaporation of the trapped water in the grooves 31*c* and 32*c* caused by the heat of the molten filaments at a high temperature which exceeds the boiling point of water. Although in the present embodiment, the depths of the grooves 31*c* and 32*c* are constant, the depths of the grooves 31*c* and 32*c* may be non-uniform. Furthermore, as long as the effects of the present invention are not impaired, the grooves 31*c* and 32*c* may be arranged in a straight or curved line, or a plurality of dimple-shaped recesses may be provided on the chute inclined plates 31*a* and 32*a*.

2. Second Embodiment

A second embodiment of the present invention will then be described. The second embodiment is basically the same as the first embodiment except the form of the grooves formed in the chutes. In the following description, emphasis will be placed on differences from the first embodiment, and configurations in common with the first embodiment may be omitted.

Figure 8:
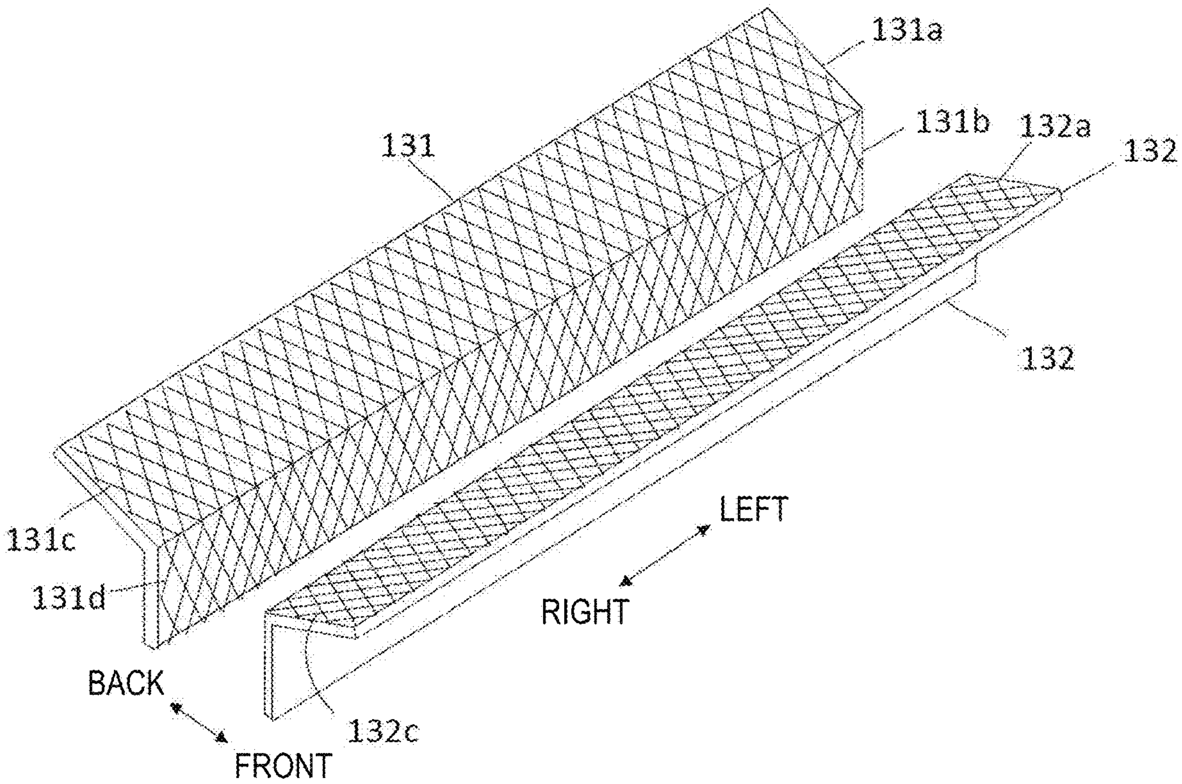
FIG. 8 is a perspective view of chutes in a manufacturing device according to a second embodiment.

FIG. 8 is a perspective view of chutes 131 and 132 in a manufacturing device 1 according to the second embodiment (parts corresponding to the chutes 31 and 32 in the first embodiment). The pair of chutes 131 and 132 include: plate-shaped chute inclined plates 131*a* and 132*a* which are inclined downward (inclined downward as they extend inward in the forward/backward direction); and plate-shaped chute vertical plates 131*b* and 132*b* which extend downward in the vertical direction from lower ends of the chute inclined plates 131*a* and 132*a*, and the pair of chutes 131 and 132 are spaced a predetermined distance.

In the upper surfaces of the chute inclined plates 131*a* and 132*a*, a plurality of grooves 131*c* and a plurality of grooves 132*c* are respectively formed obliquely at an angle equal to or greater than 30 degrees and equal to or less than 60 degrees relative to the maximum inclination direction of the chute inclined plates 131*a* and 132*a*. In the present embodiment, in the surfaces of the chute vertical plates 131*b* and 132*b* opposite each other, grooves 131*d* and 132*d* are formed obliquely at an angle equal to or greater than 30 degrees and equal to or less than 60 degrees relative to the vertical direction.

In the example of the present embodiment, for example, in the upper surface of the chute inclined plate 131*a*, the grooves 131*c* which are inclined at an angle θ (predetermined angle equal to or greater than 30 degrees and equal to or less than 60 degrees) in one direction from the maximum inclination direction are arranged at equal intervals in the left/right direction, and the grooves 131*c* which are inclined at the angle θ in the other direction from the maximum inclination direction are arranged at equal intervals in the left/right direction. The grooves 131*c* which are inclined at the angle θ in the one direction from the maximum inclination direction and the grooves 131*c* which are inclined at the angle θ in the other direction intersect each other at equal intervals.

In the chute vertical plate 131*b*, the grooves 131*d* which are inclined at the angle θ in one direction from the vertical direction are arranged at equal intervals in the left/right direction, and the grooves 131*d* which are inclined at the angle θ in the other direction from the vertical direction are arranged at equal intervals in the left/right direction. The grooves 131*d* which are inclined at the angle θ in the one direction from the vertical direction and the grooves 131*d* which are inclined at the angle θ in the other direction intersect each other at equal intervals. The grooves 131*d* are connected to the grooves 131*c* at the upper end thereof, and the lower end thereof reaches the lower edge of the chute vertical plate 131*b*.

Regarding the sizes and the shapes of the grooves 131*c*, 132*c*, 131*d* and 132*d*, in the present embodiment, the width (the size in the left/right direction) of all the grooves is equal to or greater than 0.1 mm and equal to or less than 3.0 mm, the depth of all the grooves is equal to or greater than 0.1 mm and equal to or less than 3 mm. In this way, as in the first embodiment, it is possible to reliably and stably form the thin films of the cooling water over the upper surfaces of the chute inclined plates 131*a* and 132*a*. The width of the grooves 131*c*, 132*c*, 131*d* and 132*d* may be set equal to or greater than 0.1 mm and equal to or less than 1.0 mm, or may be set equal to or greater than 0.1 mm and equal to or less than 0.5 mm. The cross-sectional shape of all the grooves 131*c*, 132*c*, 131*d* and 132*d* (cross sections taken along a plane orthogonal to the direction of extension of the grooves) is quadrangular (in the example of the present embodiment, rectangular or square) as in the first embodiment. In the quadrangle described above, the upper side is the opening surface of the groove.

Although in the present embodiment, the grooves 131*c*, 132*c*, 131*d* and 132*d* are formed to intersect each other at equal intervals, they may be formed so as not to intersect each other. Although the chute inclined plates 131*a* and 132*a* and the chute vertical plates 131*b* and 132*b* are plate-shaped, they may be curved.

As described above, in the present embodiment, the grooves 131*c* and 132*c* are formed obliquely at the angle equal to or greater than 30 degrees and equal to or less than 60 degrees relative to the maximum inclination direction of the chute inclined plates 131*a* and 132*a*. Hence, even when the inclination angle of the chute inclined plates 131*a* and 132*a* is increased to improve the sliding of the molten filaments, it is possible to suppress the flowing down of water trapped in the grooves 131*c* and 132*c*.

3. Others

Although the embodiments of the present invention have been described above, the configuration of the present invention is not limited to the embodiments described above, and various changes can be added without departing from the spirit of the present invention. It should be understood that the technical scope of the present invention is indicated not by the description of the above embodiments but by the scope of claims, and meanings equivalent to the scope of claims and all changes in the scope are included in the technical scope.

Here, as variations of the embodiments described above, examples in which the cross-sectional shape of the groove formed in the chute is changed will be described below with reference to FIGS. 9 and 10. These examples are the same as the manufacturing device 1 according to the first embodiment except the cross-sectional shape of the groove formed in the chute.

Figure 9:
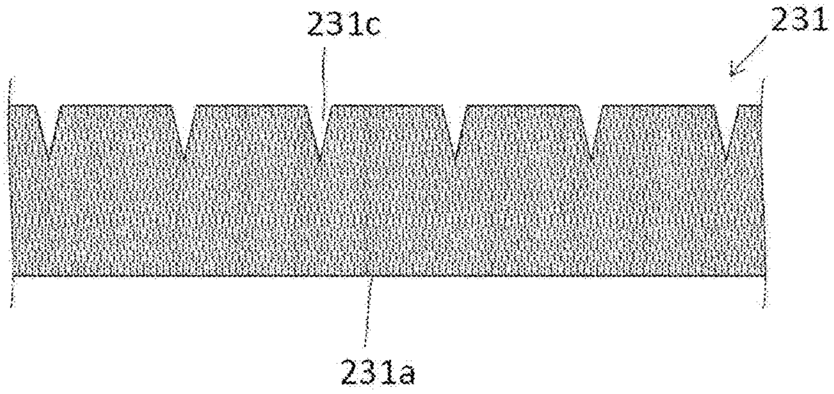
FIG. 9 is an illustrative view of a variation in which the cross-sectional shape of the grooves is changed.

FIG. 9 shows an example where the cross-sectional shape of the groove 31*c* in the chute inclined plate 31*a* is changed. In the example shown in FIG. 9, in the chute inclined plate 231*a* (corresponding to the chute inclined plate 31*a* in the first embodiment) of a chute 231 (corresponding to the chute 31 in the first embodiment), grooves 231*c* (corresponding to the grooves 31*c* in the first embodiment) are formed.

In the example shown in FIG. 9, the cross-sectional shape of the groove 231*c* is V-shaped, and the side surfaces of the groove 231*c* on both sides are in contact with each other at the end, and are inclined outward as they approach the surface of the chute inclined plate 231*a*. Even when the cross-sectional shape of the groove 231*c* is set as described above, the same effects as in the first embodiment or the effects corresponding to the first embodiment can be obtained. The cross-sectional shape of grooves in both the chute inclined plates of the chute 231 in the forward/backward direction may be V-shaped as described above, and furthermore, the cross-sectional shape of grooves in both the chute vertical plates of the chute 231 in the forward/backward direction may be V-shaped as described above.

Figure 10:
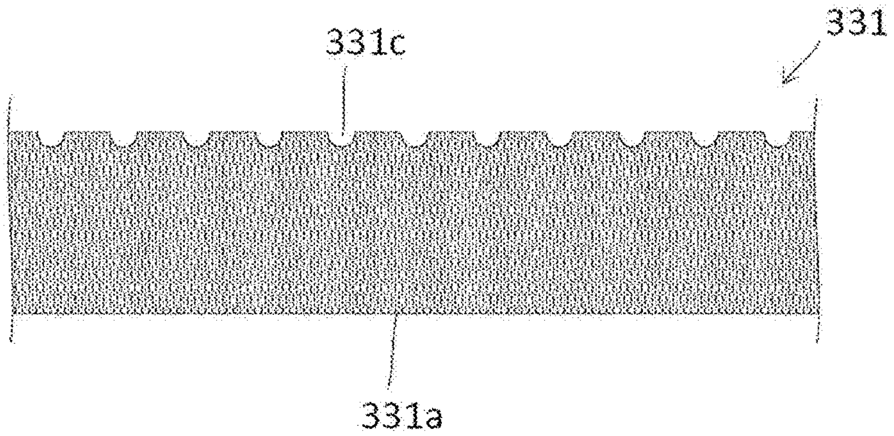
FIG. 10 is an illustrative view of another variation in which the cross-sectional shape of the grooves is changed.
Figure 11:
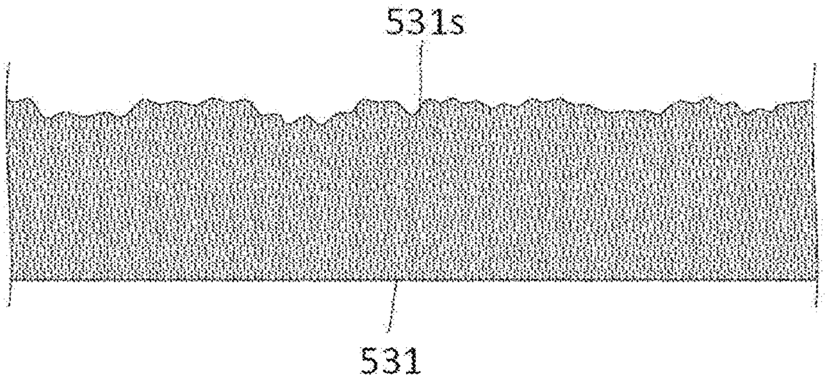
FIG. 11 is a conceptual view showing a state where the surface of the chute is roughened by sandblasting treatment.
Figure 12:
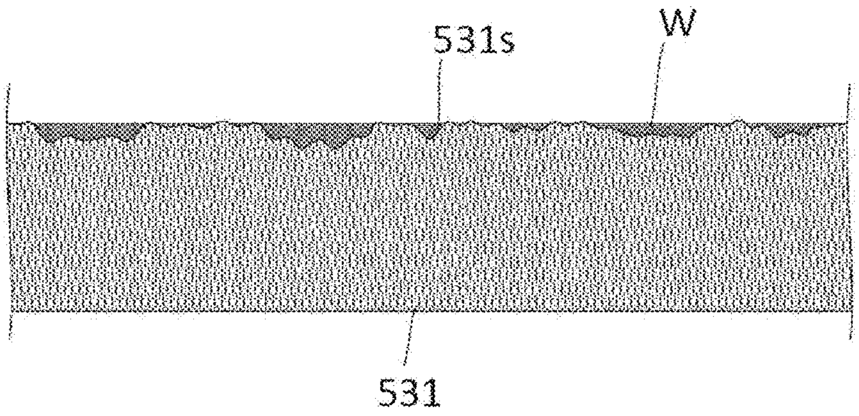
FIG. 12 is a conceptual view showing a state where the cooling water film is formed in the surface of the chute.

FIG. 10 shows another example where the cross-sectional shape of the groove 31*c* in the chute inclined plate 31*a* is changed. In the example shown in FIG. 10, in the chute inclined plate 331*a* (corresponding to the chute inclined plate 31*a* in the first embodiment) of a chute 331 (corresponding to the chute 31 in the first embodiment), grooves 331*c* (corresponding to the grooves 31*c* in the first embodiment) are formed.

In the example shown in FIG. 10, the cross-sectional shape of the groove 331*c* is U-shaped, and no corner is provided in the part where the groove 331*c* is formed. Even when the cross-sectional shape of the groove 331*c* is set as described above, the same effects as in the first embodiment or the effects corresponding to the first embodiment can be obtained. The cross-sectional shape of grooves in both the chute inclined plates of the chute 331 in the forward/backward direction may be V-shaped as described above, and furthermore, the cross-sectional shape of grooves in both the chute vertical plates of the chute 331 in the forward/backward direction may be V-shaped as described above.

The embodiments described above should be considered to be illustrative in all respects and not restrictive. It should be understood that the technical scope of the present invention is indicated not by the description of the above embodiments but by the scope of claims, and meanings equivalent to the scope of claims and all changes in the scope are included in the technical scope.

INDUSTRIAL APPLICABILITY

The present invention can be utilized for devices for manufacturing a filament three-dimensional bonded member.

The invention claimed is:

1. A device for manufacturing a filament three-dimensional bonded member, the device comprising:

a molten filament supply unit that discharges a molten filament group formed with a plurality of molten filaments downward in a vertical direction;

a chute that includes a chute inclined plate which receives the molten filament at an end in a thickness direction of the molten filament group and displaces the molten filament group in such a direction as to reduce a thickness of the molten filament group;

a cooling water supply unit that supplies cooling water to the chute inclined plate; and a fusing formation unit that three-dimensionally entangles the molten filaments and simultaneously fuses contact points, wherein a plurality of grooves are formed in an upper surface of the chute inclined plate, a width of each of the plurality of grooves is equal to or greater than 0.1 mm and equal to or less than 3.0 mm, a depth of each of the plurality of grooves is equal to or greater than 0.1 mm and equal to or less than 3 mm and a distance between the grooves adjacent to each other is equal to or greater than 1 mm and equal to or less than 7 mm.

2. The device for manufacturing a filament three-dimensional bonded member according to claim 1, wherein the plurality of grooves are formed at equal intervals to extend in parallel.

3. The device for manufacturing a filament three-dimensional bonded member according to claim 2, wherein a cross-sectional shape of each of the plurality of grooves is quadrangular.

4. The device for manufacturing a filament three-dimensional bonded member according to claim 2, wherein a hydrophilic polymer is applied to or embedded in all or a part of the plurality of grooves.

5. The device for manufacturing a filament three-dimensional bonded member according to claim 2, wherein the plurality of grooves are formed to cover an entire region on the upper surface of the chute inclined plate, the entire region receiving the molten filament, and the cooling water supply unit is arranged to supply the cooling water to all of the grooves that cover the entire region.

6. The device for manufacturing a filament three-dimensional bonded member according to claim 1, wherein the plurality of grooves are formed to extend obliquely at an angle equal to or greater than 30 degrees and equal to or less than 60 degrees relative to a maximum inclination direction of the chute inclined plate.

7. The device for manufacturing a filament three-dimensional bonded member according to claim 6, wherein a cross-sectional shape of each of the plurality of grooves is quadrangular.

8. The device for manufacturing a filament three-dimensional bonded member according to claim 6, wherein a hydrophilic polymer is applied to or embedded in all or a part of the plurality of grooves.

9. The device for manufacturing a filament three-dimensional bonded member according to claim 6, wherein the plurality of grooves are formed to cover an entire region on the upper surface of the chute inclined plate, the entire region receiving the molten filament, and the cooling water supply unit is arranged to supply the cooling water to all of the grooves that cover the entire region.

10. The device for manufacturing a filament three-dimensional bonded member according to claim 1, wherein a cross-sectional shape of each of the plurality of grooves is quadrangular.

11. The device for manufacturing a filament three-dimensional bonded member according to claim 1, wherein a hydrophilic polymer is applied to or embedded in all or a part of the plurality of grooves.

12. The device for manufacturing a filament three-dimensional bonded member according to claim 1, wherein the plurality of grooves are formed to cover an entire region on the upper surface of the chute inclined plate, the entire region receiving the molten filament, and the cooling water supply unit is arranged to supply the cooling water to all of the grooves that cover the entire region.

* * * * *